US012477268B2

(12) United States Patent
Ren et al.

(10) Patent No.: US 12,477,268 B2
(45) Date of Patent: Nov. 18, 2025

(54) SPEAKER DEVICE

(71) Applicant: AAC Microtech (Changzhou) Co., Ltd., Jiangsu (CN)

(72) Inventors: Zhang Ren, Changzhou (CN); Zhiwei Zhong, Changzhou (CN); Wei Song, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 238 days.

(21) Appl. No.: 18/520,580

(22) Filed: Nov. 28, 2023

(65) Prior Publication Data

US 2025/0126401 A1 Apr. 17, 2025

Related U.S. Application Data

(63) Continuation of application No. PCT/CN2023/124356, filed on Oct. 12, 2023.

(51) Int. Cl.

| | |
|---|---|
| ***H04R 1/24*** | (2006.01) |
| ***H04R 1/02*** | (2006.01) |
| ***H04R 7/04*** | (2006.01) |
| ***H04R 7/18*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ............... *H04R 1/24* (2013.01); *H04R 1/023* (2013.01); *H04R 7/04* (2013.01); *H04R 7/18* (2013.01); *H04R 9/025* (2013.01); *H04R 9/046* (2013.01); *H04R 9/06* (2013.01); *H04R 2400/11* (2013.01)

(58) Field of Classification Search

CPC . H04R 1/24; H04R 1/023; H04R 7/04; H04R 7/18; H04R 9/025; H04R 9/046; H04R 9/06; H04R 2400/11; H04R 7/127; H04R 9/045; H04R 9/063

See application file for complete search history.

(56) References Cited

U.S. PATENT DOCUMENTS

| | | | | |
|---|---|---|---|---|
| 2013/0011000 A1* | 1/2013 | Xi | H04R 9/025 | 381/412 |
| 2015/0139479 A1* | 5/2015 | Lai | H04R 9/025 | 381/412 |
| 2024/0073612 A1* | 2/2024 | Ren | H04R 7/18 | |

* cited by examiner

*Primary Examiner* — Ivian C Chin
*Assistant Examiner* — Annabelle Kang
(74) *Attorney, Agent, or Firm* — Wiersch Law Group

(57) ABSTRACT

The present application provides a speaker device, including: a magnetic circuit system including a lower splint; a first main magnetic steel provided with two second through-holes; a sub-magnetic steel spaced apart from the first main magnetic steel to form a first magnetic gap; a pole core, including a pole core body, a pole core wall, a pole core plate and two third through-holes through the pole core plate; a second main magnetic, spaced from the pole core wall to form a second magnetic gap; an upper splint; a second frame; and both ends of the conductive member are fixed to the top of the pole core plate after passing through the first through-hole, the two second through-holes, and the two third through-holes, and electrically connected to the second voice coil. Compared with the related art, the acoustic performance of the speaker device of the present application is superior.

9 Claims, 4 Drawing Sheets

B-B

SPEAKER DEVICE

CROSS-REFERENCE TO RELATED APPLICATIONS

This application is a continuation of International Application No. PCT/CN2023/124356, filed Oct. 12, 2023, the entire contents of which are incorporated herein by reference.

TECHNICAL FIELD

The present application relates to the field of electroacoustic conversion, in particular to a speaker device.

BACKGROUND

The speaker device is a transducer that converts electrical signals into sound signals. It is primarily categorized into two modes: the single vibration system and the dual vibration system. In the dual vibration system mode, the speaker device includes a first vibration system fixed to a frame for producing low-frequency sounds and a second vibration system fixed to the magnetic circuit for producing high-frequency sounds.

In the speaker device with the dual vibration system mode in the related art, since the second vibration system is fixedly supported in a central region of the magnetic circuit, which cannot be directly connected to the frame, its voice coil cannot be connected to the external circuit board through the conductive members arranged on the frame. Therefore, in the speaker device of the related art, a through-hole that traverses the entire magnetic circuit system is provided at the bottom of the magnetic circuit system, which is configured to make way for the conductive member, and the conductive member is then placed in this through-hole such that the top of the conductive member is located below the second vibration system, so as to introduce electrical signals to the voice coil of the second vibration system. However, in the related art, the overall structure of the middle of the magnetic circuit system is hollowed out due to the introduction of the through-hole, and the effective volume of the magnetic circuit system is reduced, leading to a decrease in the overall magnetic potential of the system, i.e., the driving force is weakened, resulting in a decrease in the acoustic performance of the speaker device.

Therefore, it is necessary to provide a new speaker device to solve the above technical problem.

SUMMARY

An object of the present application is to provide a speaker device with better acoustic performance in dual vibration system mode.

In order to achieve the above object, the present application provides a speaker device, comprising:

- a first frame;
- a first vibration system, comprising:
  - a first diaphragm fixed at its outer periphery to the first frame; and
  - a first voice coil configured to drive the first diaphragm to vibrate for sound production;
- a magnetic circuit system, fixed to the first frame, wherein a side of the magnetic circuit system close to the first vibration system is provided with a first magnetic gap and a second magnetic gap; the first magnetic is arranged around the second magnetic gap, and the first voice coil is inserted and suspended in the first magnetic gap;
- a second frame, fixed to a top of the magnetic circuit system;
- a second vibration system, comprising:
  - a second diaphragm fixed at its outer periphery to a side of the second frame away from the magnetic circuit system; and
  - a second voice coil configured to drive the second diaphragm to vibrate for sound production, which is inserted and suspended in the second magnetic gap;
- a conductive member, extended from a bottom of the magnetic circuit system through the magnetic circuit system toward a bottom of the second diaphragm, and electrically connected to the second voice coil;
- wherein the magnetic circuit system comprises:
  - a lower splint, provided with a first through-hole, wherein the first through-hole is arranged through the lower splint;
  - a first main magnetic steel, fixedly stacked on the lower splint, and provided with two second through-holes, wherein the two second through-holes are both arranged through the first main magnetic steel;
  - a sub-magnetic steel, arranged around the first main magnetic steel and spaced apart from the first main magnetic steel to form the first magnetic gap;
  - a pole core, comprising:
    - a pole core body fixedly stacked on the first main magnetic steel and in the shape of an annulus;
    - a pole core wall bent and extended from an inner peripheral side of the pole core body along a direction close to the second diaphragm;
    - a pole core plate formed at a top of the pole core wall; and
    - two third through-holes arranged through the pole core plate;
  - a second main magnetic steel, fixedly stacked on the pole core body, wherein the second main magnetic steel is arranged around the pole core wall and spaced apart from the pole core wall to form the second magnetic gap; the second frame is fixedly supported on a top of the second main magnetic steel; and
  - an upper splint, fixedly stacked on the sub-magnetic steel and fixedly connected to the first frame;
- wherein the conductive member comprises: an external conductive disk abutted against a bottom of the first main magnetic steel, two extension walls extended from opposite ends of the external conductive disk and passed through the two second through-holes and the two third through-holes, and two connection walls formed by bending and extending the two extension walls, and fixed to a top of the pole core plate and spaced apart from each other; wherein the two connection walls are used to act as welding pads, and a positive terminal and a negative terminal of the second voice coil are electrically connected to the two connection walls, respectively.

In one embodiment, the two second through-holes are provided orthogonally to the two third through-holes, respectively; orthogonal projections of the second through-holes, and the third through-holes downwardly along a vibration direction of the second diaphragm are entirely located within the first through-hole.

In one embodiment, the magnetic circuit system further comprises a secondary pole core fixedly stacked on a side of the second main magnet away from the pole core body and in the shape of an annulus, wherein an inner peripheral side of the second frame is fixedly connected to an outer peripheral side of the secondary pole core.

In one embodiment, the first diaphragm comprises:

a first folded ring in the shape of an annulus;

a second folded ring in the shape of an annulus, which is spaced apart from the first folded ring and arranged on an inner side of the first folded ring; and a first vibration portion in the shape of an annulus, which is formed by bending and extending from an inner peripheral side of the first folded ring to be connected to an outer peripheral side of the second folded ring;

wherein an outer peripheral side of the first folded ring is fixed to the first frame; an inner peripheral side of the second folded ring is fixed to a side of the second main magnetic steel away from the first main magnetic steel; and the first voice coil is fixed to a side of the first vibration portion close to the magnetic circuit system.

In one embodiment, the inner peripheral side of the second folded ring is fixed between the second frame and the second main magnetic steel.

In one embodiment, the first vibration system further comprises a first skeleton and an elastic support assembly, wherein the first skeleton comprises a skeleton body in the shape of an annulus for acting as the first vibration portion and a skeleton fixing portion formed by downwardly bent and extended from an outer peripheral side of the skeleton body; wherein one end of the elastic support assembly is fixed to the first frame, and the other end of the elastic support assembly is fixed to the skeleton fixing portion.

In one embodiment, the second diaphragm comprises a second vibration portion, a third folded ring formed by extended outwardly from an outer peripheral side of the second vibration portion and in the shape of an annulus, and a dome covered on the second vibration portion, wherein an outer peripheral side of the third folded ring is fixed to a side of the second frame away from the second main magnetic steel, and the second voice coil is fixed to the second vibration portion.

In one embodiment, the second diaphragm further comprises an auxiliary dome in the shape of an annulus and fixed to a side of the second vibration portion close to the magnetic circuit system; wherein the auxiliary dome is located on a side of the second vibration portion away from the magnetic circuit system, and the second voice coil is fixed to a side of the auxiliary dome close to the magnetic circuit system.

In one embodiment, the speaker device further comprises a dust cover, wherein the dust cover comprises a cover body in the shape of an annulus and fixed to a peripheral side of the lower splint, a cover wall formed by bending and extending from opposite sides of the cover body, and a plurality of air holes arranged through the cover wall, wherein the cover wall is fixedly connected to the first frame.

Compared with the related art, in the speaker device of the present application, the lower splint of the magnetic circuit system is equipped with a first through-hole; two second through-holes are arranged through the first main magnetic steel, and the first main magnetic steel is fixedly stacked on the lower splint. Besides, the pole core includes a pole core body fixedly stacked on the first main magnetic steel and in the shape of an annulus, a pole core wall bent and extended from an inner peripheral side of the pole core body, a pole core plate formed at a top of the pole core wall, and two third through-holes arranged through the pole core plate, so that the conductive member can pass from the bottom of the magnetic circuit system through the first through-hole, the second through-holes, and the third through-holes in sequence to reach the bottom the second diaphragm for generating high-frequency sounds, thereby realizing the purpose of power supply for the second voice coil, and efficiently adjusting a winding process of the second voice coil for controlling the total extension length of the voice coil wires at the two ends, so as to achieve amplitude adjustment of the second amplitude adjustment of the vibration system. Besides, although the conductive member is also extended from the bottom of the magnetic circuit system towards the top, a middle portion of the first main magnetic steel does not have to be hollowed out as a whole to give way to the conductive member, but rather through the arrangement of two second through-holes to enable the conductive member to pass through, so that the first main magnetic steel is partially retained between the second through-holes, and the size of the volume of the first main magnetic steel is increased as much as possible, thereby effectively improving the magnetic potential of the magnetic circuit system. Besides, a protruding structure on the pole core formed by the pole core wall and the pole core plate makes the pole core as a whole without having to be hollowed out, and allows the conductive member to pass through the two third through-holes provided on the pole core plate, so that the portion of the pole core between the two third through-holes is retained, and the loss of magnetic lines of force is reduced to a great extent, thus jointly making the acoustic performance of the speaker device better.

BRIEF DESCRIPTION OF THE DRAWINGS

In order to illustrate the technical solutions in the embodiments of the present application more clearly, the accompanying drawings to be used in the description of the embodiments will be briefly introduced below. Obviously, the accompanying drawings in the following description are only some embodiments of the present application, and for those of ordinary skill in the field, other accompanying drawings may be obtained based on these drawings without creative labor.

DETAILED DESCRIPTION OF THE EMBODIMENTS

The technical solutions in the embodiments of the present application will be described clearly and completely in the following in conjunction with the accompanying drawings in the embodiments of the present application. Obviously, the described embodiments are only a part of the embodiments of the present application and not all of the embodiments. Based on the embodiments in the present application, all other embodiments obtained by those of ordinary skill in the art without making creative labor are within the protection scope of the present application.

Figure 1:
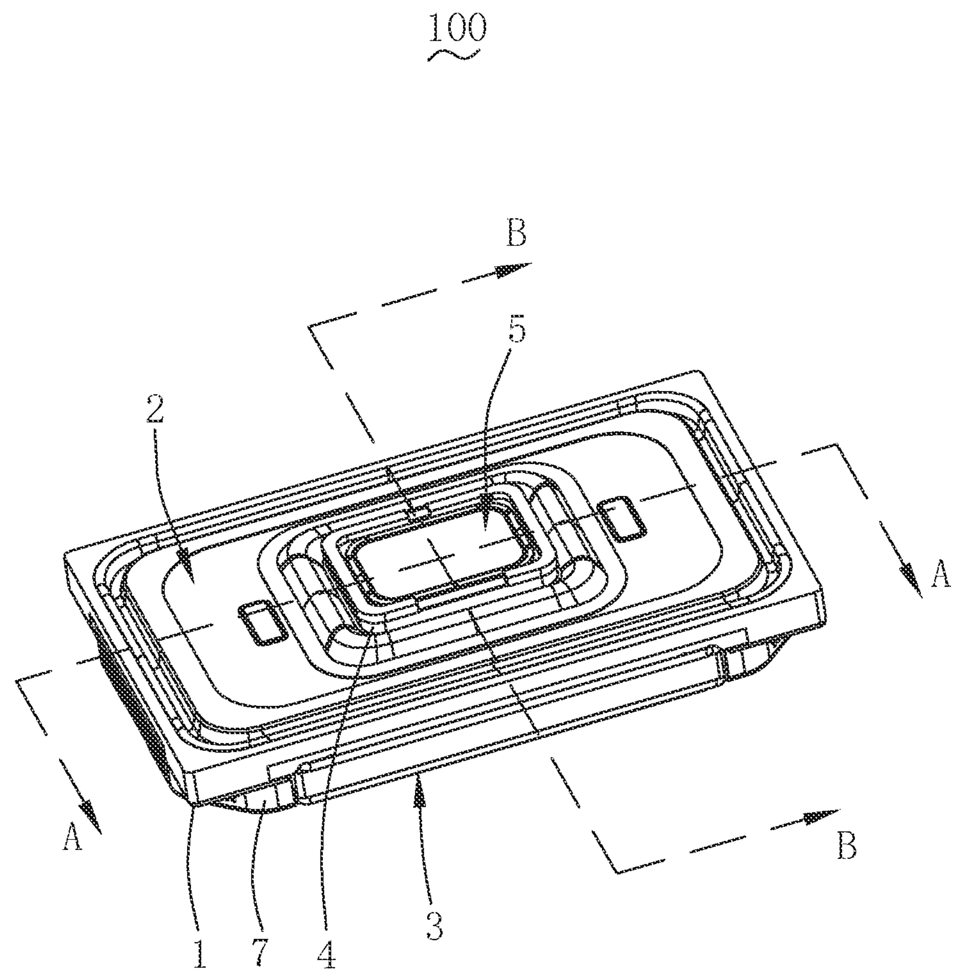
FIG. 1 shows a three-dimensional structural diagram of a speaker device according to an embodiment of the present application.
Figure 2:
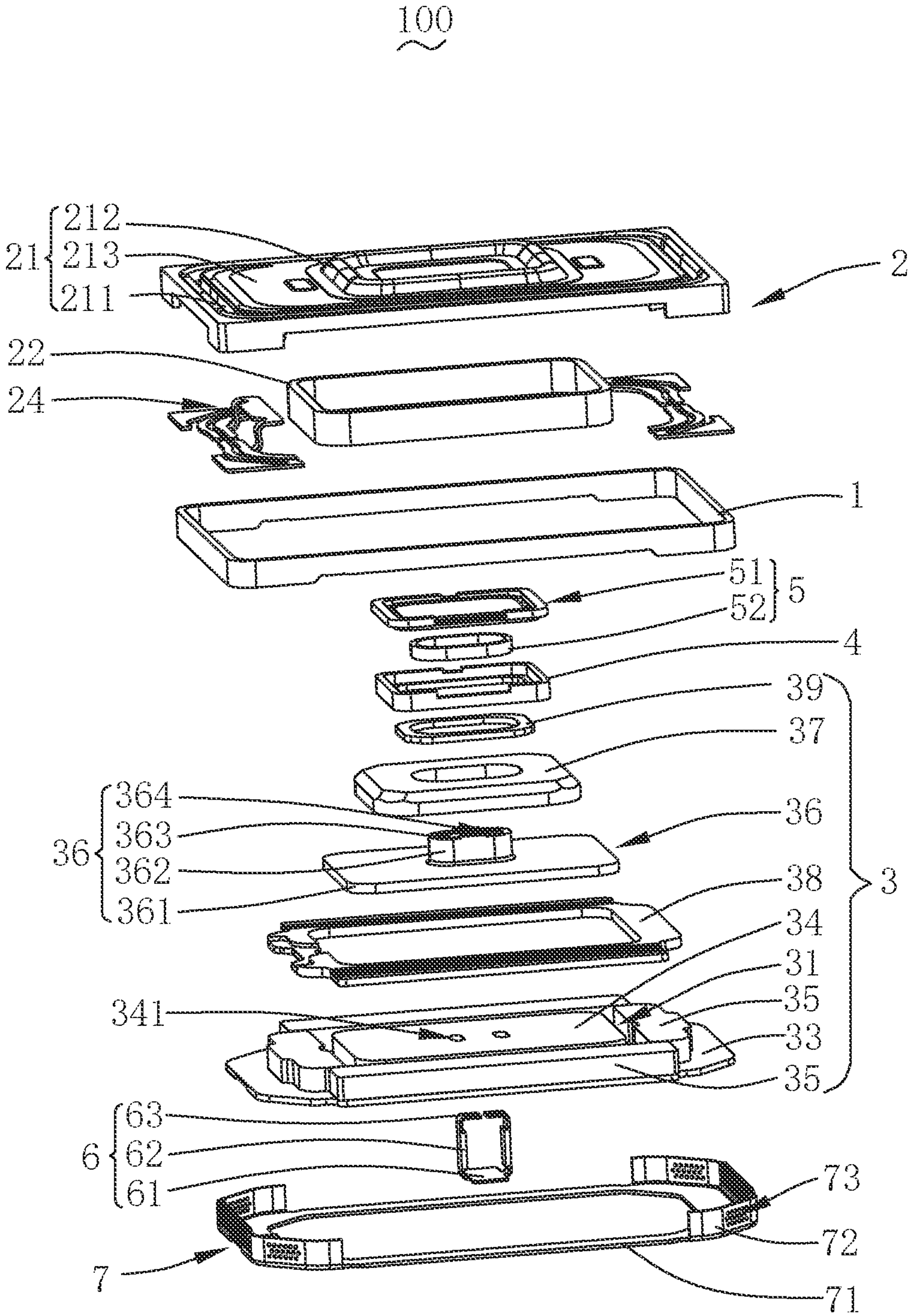
FIG. 2 shows a three-dimensional exploded view of the speaker device according to an embodiment of the present application.
Figure 3:
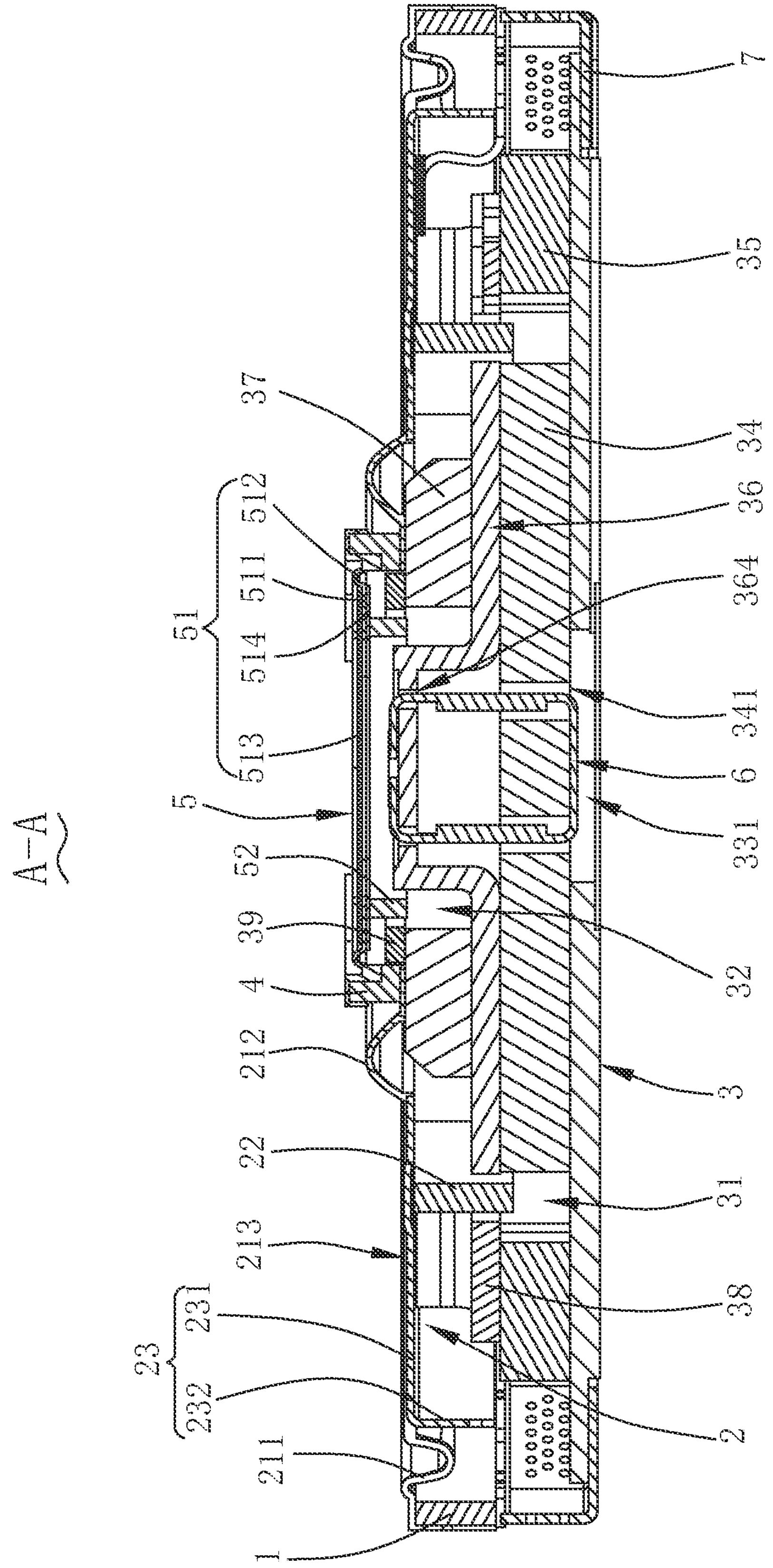
FIG. 3 shows a sectional view of line A-A in FIG. 1.
Figure 4:
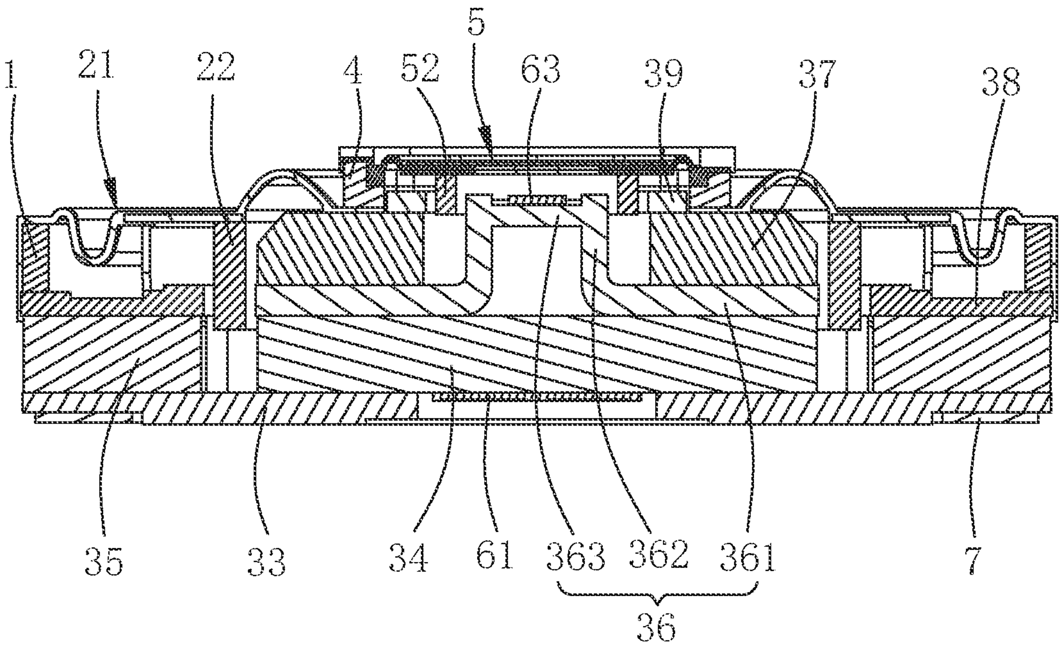
FIG. 4 shows a sectional view of line B-B in FIG. 1.

Combined with FIGS. 1 to 6, embodiments of the present application provide a speaker device 100, including a first frame 1, a first vibration system 2, a magnetic circuit system 3, a second frame 4, a second vibration system 5, and a conductive member 6.

The first frame 1 is configured to support the first vibration system 2 and the magnetic circuit system 3. In this embodiment, the first frame 1 is a ring-like structure surrounded by metal sheets.

The first vibration system 2 includes a first diaphragm 21 fixed at its outer periphery to the first frame 1, and a first voice coil 22 configured to drive the first diaphragm 21 to vibrate for sound production. In this embodiment, the first diaphragm 21 is configured to generate low-frequency sounds.

The magnetic circuit system 3 is fixed to the first frame 1, and the magnetic circuit system 3 is provided with a first magnetic gap 31 and a second magnetic gap 32 on a side close to the first vibration system 2. The first magnetic gap 31 is arranged around the second magnetic gap 32, and the first voice coil 22 is inserted and suspended in the first magnetic gap 31.

The second frame 4 is fixed to the top of the magnetic circuit system 3, which is configured to support the second vibration system 5.

The second vibration system 5 includes a second diaphragm 51 fixed to a side of the second frame 4 away from the magnetic circuit system 3 at its outer periphery and a second voice coil 52 configured to drive the second diaphragm 51 to vibrate for sound production. The second voice coil 52 is inserted and suspended above the second magnetic gap 32. In this embodiment, the second diaphragm 51 is configured to produce high-frequency sound.

That is, the first vibration system 2 and the second vibration system 5 share the magnetic circuit system 3, and are driven by the magnetic circuit system 3 to produce sounds in different frequency bands, respectively.

The conductive member 6 is extended from a bottom of the magnetic circuit system 3 through the magnetic circuit system 3 to a bottom of the second diaphragm 51, and is electrically connected to the second voice coil 52, so as to introduce external electrical signals to the second voice coil 52. The electrical signals of the first voice coil 22 is powered by means of conductive terminals fixed to the first frame 1.

Specifically, in this embodiment, the magnetic circuit system 3 includes a lower splint 33, a first main magnetic steel 34, a sub-magnetic steel 35, a pole core 36, a second main magnetic steel 37, and an upper splint 38.

The lower splint 33 is configured to support the first main magnetic steel 34 and the sub-magnetic steel 35. The lower splint 33 is provided with a first through-hole 311, and the first through-hole 311 is arranged through the lower splint 33.

The first main magnetic steel 34 is fixedly stacked on the lower splint 31, and the first main magnetic steel 34 is provided with two second through-holes 341 arranged through it. Since the first main magnetic steel 34 is not hollowed out in its center for giving way, but rather a portion of the first main magnetic steel 34 between the two second through-holes 341 is retained through the provision of the two second through-holes 341, which greatly retains the overall effective volume of the first main magnetic steel 34 and can provide a larger magnetic field performance, thereby greatly preserving the overall effective volume of the first main magnet 32 and providing greater magnetic field performance.

The sub-magnetic steel 35 is arranged around the first main magnetic steel 34 and spaced from the first main magnetic steel 34 to form the first magnetic gap 31.

The pole core 36 includes a pole core body 361 fixedly stacked on the first main magnetic steel 34 and in the shape of an annular, a pole core wall 362 in the shape of an annular bending and extending from an inner peripheral side of the pole core body 361 along a direction close to the second diaphragm 51, a pole core plate 363 formed at the top of the pole core wall 362, and two third through-holes 364 arranged through the pole core plate 363. The pole core 36 is configured to conduct magnetism and is covered on the first main magnetic steel 34, which can minimize the loss of magnetic lines of force generated by the first main magnetic steel 34, thereby improving the magnetic field performance. In this embodiment, the pole core plate 363 corresponding to the middle position of the pole core 36 is not hollowed out as a whole to give way to the magnetic field, but the portion of the pole core plate 363 located between the two third through-holes 364 is retained for magnetic conduction through the provision of the two third through-holes 364, which greatly avoids the loss of magnetic lines of force generated by the first main magnet steel 34, making the magnetic field performance of the magnetic circuit system 3 better.

The second main magnet steel 37 is fixedly stacked on the pole core body 361. The second main magnet steel 37 is arranged around the pole core wall 362 and spaced from the pole core wall 362 to form the second magnetic gap 32, and the second frame 4 is fixedly supported on the top of the second main magnet steel 37.

The upper splint 38 is fixedly stacked on the sub-magnetic steel 35 and fixedly connected to the first frame 1, thereby fixing the entire magnetic circuit system 3 to the first frame 1. Of course, it is also possible to fix the entire magnetic circuit system 3 to the first frame 1 by means of the lower splint 33 fixedly connected to the first frame 1.

The conductive member 6 is formed by bending a strip-shaped conductive structure, such as a flexible circuit board, and such that both ends of the conductive member 6 are fixed to the top of the pole core plate 363 from the bottom of the magnetic circuit system 3 through the first through-hole 331, the two second through-holes 341 and two third through-holes 364, respectively, and are electrically connected to the second voice coil 52, thereby supplying power to the second voice coil 52.

Specifically, in this embodiment, the conductive member 6 includes an external conductive disk 61 abutted against the bottom of the first main magnetic steel 34, two extension walls 62 extending from opposite ends of the external conductive disk 61 and arranged through the two second through-holes 341 and the two third through-holes 364, two connection walls 63 extended to be fixed to the top of the pole core plate 363 and spaced apart from each other. The external conductive disk 61 is configured to connect to an external electrical signal source, and the two connection walls 63 are used to act as welding pads. A positive terminal and a negative terminal of the second voice coil 52 are electrically connected to the two connection walls 63. In this embodiment, the conductive member 6 is a flexible printed circuit board (FPCB).

In this embodiment, the two second through-holes 341 are provided orthogonally to the two third through-holes 364, respectively. Orthogonal projections of the second through-holes 341 and the third through-holes 364 downwardly along a vibration direction of the second diaphragm 51 are entirely located within the range of the first through-holes 331. This structure is provided to facilitate the assembly of the conductive member 6, so that the extension walls 62 of the conductive member 6 will not be deformed for better reliability.

In order to further improve the magnetic field performance of the magnetic circuit system 3, the magnetic circuit system 3 further includes a secondary pole core 39 stacked on a side of the second main magnetic steel 37 away from the pole core body 361 and in the shape of an annulus, which effectively reduces the loss of magnetic lines of force of the second main magnetic steel 37. The inner peripheral side of the second frame 4 is fixedly connected to the outer peripheral side of the secondary pole core 39, thereby improving the structural stability of the second frame 4.

In this embodiment, both the first diaphragm 21 and the second diaphragm 51 may be a single-folded ring structure. In this case, the first diaphragm 21 is located above the second diaphragm 51 to cover the second diaphragm 51, and the second diaphragm 51 is required to form a side sounding. Of course, it is also possible for the present embodiment: the first diaphragm 21 is a double-folded ring structure, and the second diaphragm 51 is a single-folded ring structure, which is basically located in the same plane, and the specific structure is as follows.

The first diaphragm 21 includes a first folded ring 211 in the shape of an annulus, a second folded ring 212 in the shape of an annulus, which is spaced apart from the first folded 211 and arranged on the inside of the first folded ring 211, and a first vibration portion 213 in the shape of an annulus, which is formed by bending and extending from the inner peripheral side of the first folded ring 211 and connected to the outer peripheral side of the second folded ring 212. The outer peripheral side of the first folded ring 211 is fixed to the first frame 1, and the inner peripheral side of the second folded ring 212 is fixed to the side of the second main magnetic steel 37 away from the first main magnetic steel 34. The first voice coil 22 is fixed to the side of the first vibration section 213 close to the magnetic circuit system 3.

In an embodiment, the inner peripheral side of the second folded ring 212 is fixed between the second frame 4 and the second main magnetic steel 37, thereby improving the structural stability of the first diaphragm 21 during vibration.

In this embodiment, the first vibration system 2 further includes a first skeleton 23 and an elastic support assembly 24. The first skeleton 23 includes a skeleton body 231 in the shape of an annulus for acting as the first vibration portion 213, and a skeleton fixing portion 232 formed by downwardly bending and extending from an outer periphery of the skeleton body 231. One end of the elastic support assembly 24 is fixed to the first frame 1, and the other end of the elastic support assembly 24 is fixed to the skeleton fixing portion 232 to increase the vibration performance of the first diaphragm 21 and improve the anti-transverse swinging ability of the first voice coil 22, thereby improving reliability. Of course, the elastic support assembly 24 may be a Flexible Printed Circuit (FPC), i.e., it also introduces electrical signals to the first voice coil 22.

The second diaphragm 51 includes a second vibration portion 511, a third folded ring 512 formed by extended outwardly from an outer periphery of the second vibration portion 511 and in the shape of an annulus, and a dome 512 covered on the second vibration portion 511. An outer periphery of the third folded ring 512 is fixed to a side of the second frame 4 away from the second main magnetic steel 37, and the second voice coil 52 is fixed to the second vibration section 511.

In an embodiment, the second diaphragm 51 further includes an auxiliary dome 514 in the shape of an annulus and fixed on the side of the second vibration portion 511 close to the magnetic circuit system 3. The dome 513 is located on a side of the second vibration portion 511 away from the magnetic circuit system 3, and the second voice coil 52 is fixed on the side of the auxiliary dome 514 close to the magnetic circuit system 3. The provision of the auxiliary dome 514 allows the second voice coil 52 to be inserted more into the second magnetic gap 32, thereby improving the vibration performance of the second diaphragm 51.

The speaker device 100 further includes a dust cover 7, which includes a cover body 71 in the shape of an annulus and fixed to a periphery of the lower splint 33, a cover wall 72 formed by bending and extending from the opposite sides of the cover body 71, and a plurality of air holes 73 arranged through the cover wall 72. The cover wall 72 is fixedly connected to the first frame 1. The cover wall 72 may be located at any of the positions of the four corners, the position of the long-axis side, and the position of the short-axis side of the lower splint 33.

Compared with the related art, in the speaker device of the present application, the lower splint of the magnetic circuit system is equipped with a first through-hole; two second through-holes are arranged through the first main magnetic steel, and the first main magnetic steel is fixedly stacked on the lower splint. Besides, the pole core includes a pole core body fixedly stacked on the first main magnetic steel and in the shape of an annulus, a pole core wall bent and extended from an inner peripheral side of the pole core body, a pole core plate formed at a top of the pole core wall, and two third through-holes arranged through the pole core plate, so that the conductive member can pass from the bottom of the magnetic circuit system through the first through-hole, the second through-holes, and the third through-holes in sequence to reach the bottom the second diaphragm for generating high-frequency sounds, thereby realizing the purpose of power supply for the second voice coil, and efficiently adjusting a winding process of the second voice coil for controlling the total extension length of the voice coil wires at the two ends, so as to achieve amplitude adjustment of the second amplitude adjustment of the vibration system. Besides, although the conductive member is also extended from the bottom of the magnetic circuit system towards the top, a middle portion of the first main magnetic steel does not have to be hollowed out as a whole to give way to the conductive member, but rather through the arrangement of two second through-holes to enable the conductive member to pass through, so that the first main magnetic steel is partially retained between the second through-holes, and the size of the volume of the first main magnetic steel is increased as much as possible, thereby effectively improving the magnetic potential of the magnetic circuit system. Besides, a protruding structure on the pole core formed by the pole core wall and the pole core plate makes the pole core as a whole without having to be hollowed out, and allows the conductive member to pass through the two third through-holes provided on the pole core plate, so that the portion of the pole core between the two third through-holes is retained, and the loss of magnetic lines of force is reduced to a great extent, thus jointly making the acoustic performance of the speaker device better.

Described above are only some embodiments of the present application, and it should be noted herein that improvements may be made by those of ordinary skill in the art without departing from the inventive conception of the present application, but all of these fall within the protection scope of the present application.

What is claimed is:

1. A speaker device, comprising:
a first frame;
a first vibration system, comprising:
a first diaphragm fixed at its outer periphery to the first frame; and
a first voice coil configured to drive the first diaphragm to vibrate for sound production;
a magnetic circuit system, fixed to the first frame, wherein a side of the magnetic circuit system close to the first vibration system is provided with a first magnetic gap and a second magnetic gap; the first magnetic is arranged around the second magnetic gap, and the first voice coil is inserted and suspended in the first magnetic gap;
a second frame, fixed to a top of the magnetic circuit system;
a second vibration system, comprising:
a second diaphragm fixed at its outer periphery to a side of the second frame away from the magnetic circuit system; and
a second voice coil configured to drive the second diaphragm to vibrate for sound production, which is inserted and suspended in the second magnetic gap;
a conductive member, extended from a bottom of the magnetic circuit system through the magnetic circuit system toward a bottom of the second diaphragm, and electrically connected to the second voice coil;
wherein the magnetic circuit system comprises:
a lower splint, provided with a first through-hole, wherein the first through-hole is arranged through the lower splint;
a first main magnetic steel, fixedly stacked on the lower splint, and provided with two second through-holes, wherein the two second through-holes are both arranged through the first main magnetic steel;
a sub-magnetic steel, arranged around the first main magnetic steel and spaced apart from the first main magnetic steel to form the first magnetic gap;
a pole core, comprising:
a pole core body fixedly stacked on the first main magnetic steel and in the shape of an annulus;
a pole core wall bent and extended from an inner peripheral side of the pole core body along a direction close to the second diaphragm;
a pole core plate formed at a top of the pole core wall; and
two third through-holes arranged through the pole core plate;
a second main magnetic steel, fixedly stacked on the pole core body, wherein the second main magnetic steel is arranged around the pole core wall and spaced apart from the pole core wall to form the second magnetic gap; the second frame is fixedly supported on a top of the second main magnetic steel; and
an upper splint, fixedly stacked on the sub-magnetic steel and fixedly connected to the first frame;
wherein the conductive member comprises: an external conductive disk abutted against a bottom of the first main magnetic steel, two extension walls extended from opposite ends of the external conductive disk and passed through the two second through-holes and the two third through-holes, and two connection walls formed by bending and extending the two extension walls, and fixed to a top of the pole core plate and spaced apart from each other; wherein the two connection walls are used to act as welding pads, and a positive terminal and a negative terminal of the second voice coil are electrically connected to the two connection walls, respectively.

2. The speaker device of claim 1, wherein the two second through-holes are provided orthogonally to the two third through-holes, respectively; orthogonal projections of the second through-holes, and the third through-holes downwardly along a vibration direction of the second diaphragm are entirely located within the first through-hole.

3. The speaker device of claim 1, wherein the magnetic circuit system further comprises a secondary pole core fixedly stacked on a side of the second main magnet away from the pole core body and in the shape of an annulus, wherein an inner peripheral side of the second frame is fixedly connected to an outer peripheral side of the secondary pole core.

4. The speaker device of claim 3, wherein the first diaphragm comprises:
a first folded ring in the shape of an annulus;
a second folded ring in the shape of an annulus, which is spaced apart from the first folded ring and arranged on an inner side of the first folded ring; and
a first vibration portion in the shape of an annulus, which is formed by bending and extending from an inner peripheral side of the first folded ring to be connected to an outer peripheral side of the second folded ring;
wherein an outer peripheral side of the first folded ring is fixed to the first frame; an inner peripheral side of the second folded ring is fixed to a side of the second main magnetic steel away from the first main magnetic steel; and the first voice coil is fixed to a side of the first vibration portion close to the magnetic circuit system.

5. The speaker device of claim 4, wherein the inner peripheral side of the second folded ring is fixed between the second frame and the second main magnetic steel.

6. The speaker device of claim 5, wherein the first vibration system further comprises a first skeleton and an elastic support assembly, wherein the first skeleton comprises a skeleton body in the shape of an annulus for acting as the first vibration portion and a skeleton fixing portion formed by downwardly bent and extended from an outer peripheral side of the skeleton body; wherein one end of the elastic support assembly is fixed to the first frame, and the other end of the elastic support assembly is fixed to the skeleton fixing portion.

7. The speaker device of claim 1, wherein the second diaphragm comprises a second vibration portion, a third folded ring formed by extended outwardly from an outer peripheral side of the second vibration portion and in the shape of an annulus, and a dome covered on the second vibration portion, wherein an outer peripheral side of the third folded ring is fixed to a side of the second frame away from the second main magnetic steel, and the second voice coil is fixed to the second vibration portion.

8. The speaker device of claim 7, wherein the second diaphragm further comprises an auxiliary dome in the shape of an annulus and fixed to a side of the second vibration portion close to the magnetic circuit system, wherein the auxiliary dome is located on a side of the second vibration portion away from the magnetic circuit system, and the second voice coil is fixed to a side of the auxiliary dome close to the magnetic circuit system.

9. The speaker device of claim 1, further comprising a dust cover, wherein the dust cover comprises a cover body in the shape of an annulus and fixed to a peripheral side of the lower splint, a cover wall formed by bending and extending from opposite sides of the cover body, and a plurality of air holes arranged through the cover wall, wherein the cover wall is fixedly connected to the first frame.

* * * * *